US012631482B2

(12) United States Patent
Zheng

(10) Patent No.: US 12,631,482 B2
(45) Date of Patent: May 19, 2026

(54) MASS DETECTION DEVICE, MASS DETECTION SYSTEM, AND MASS DETECTION METHOD BASED ON MULTI-SENSOR SIGNAL FUSION

(71) Applicant: SMYZE INTELLIGENCE TECHNOLOGY (SHANGHAI) CO., LTD, Shanghai (CN)

(72) Inventor: Fang Zheng, Shanghai (CN)

(73) Assignee: SMYZE INTELLIGENCE TECHNOLOGY (SHANGHAI) CO., LTD, Shanghai (CN)

( * ) Notice: Subject to any disclaimer, the term of this patent is extended or adjusted under 35 U.S.C. 154(b) by 206 days.

(21) Appl. No.: 18/455,022

(22) Filed: Aug. 24, 2023

(65) Prior Publication Data

US 2024/0310204 A1    Sep. 19, 2024

(30) Foreign Application Priority Data

Mar. 13, 2023    (CN) .......................... 202310239329.2

(51) Int. Cl.
*G01G 19/52*        (2006.01)
*G01G 7/02*         (2006.01)

(52) U.S. Cl.
CPC .............. *G01G 19/52* (2013.01); *G01G 7/02* (2013.01)

(58) Field of Classification Search
CPC ............ G01G 19/52; G01G 3/12; G01G 3/14; G01G 3/16; G01G 7/02
See application file for complete search history.

(56) References Cited

U.S. PATENT DOCUMENTS 4,375,243 A * 3/1983 Doll ....................... G01G 3/142
                                                    177/25.17
4,660,667 A * 4/1987 Uchimura .............. G01G 23/00
                                                    177/164
(Continued)

FOREIGN PATENT DOCUMENTS

CN          105928600 A      9/2016
EP           0674158 A2      9/1995
(Continued)

OTHER PUBLICATIONS

Extended European Search Report issued in corresponding European Patent Application No. 23194722.7 dated Jan. 30, 2024, pp. 1-5.

(Continued)

*Primary Examiner* — Natalie Huls
(74) *Attorney, Agent, or Firm* — PV IP PC; Wei Te Chung

(57)                ABSTRACT
The mass detection device includes a processor; at least one sensor assembly at least including a first sensor and a second sensor; the sensor assembly is configured to be connected to the processor and output a first sensing information and a second sensing information related to a mass of an object to be measured; wherein the processor is configured to acquire the first sensing information and the second sensing information to determine an initially measured mass of the object to be measured by each sensor, and according to a comparison between a selected initially measured mass of the object to be measured and a first set threshold and a comparison between an absolute value of a difference in the initially measured mass of the object to be measured by each sensor and a second set threshold, to determine a final mass of the object to be measured.

18 Claims, 6 Drawing Sheets

(56)                    References Cited

U.S. PATENT DOCUMENTS

| | | | | |
|---|---|---|---|---|
| 5,119,896 A * | 6/1992 | Freeman | .............. | G01G 3/1402 |
| | | | | 177/244 |
| 5,190,117 A * | 3/1993 | Freeman | .............. | G01G 23/005 |
| | | | | 177/244 |
| 2003/0019797 A1 * | 1/2003 | Yamamoto | .............. | A61J 3/074 |
| | | | | 209/649 |
| 2024/0183704 A1 * | 6/2024 | Bean | ...................... | G01G 19/14 |

FOREIGN PATENT DOCUMENTS

| | | | |
|---|---|---|---|
| EP | 1347274 A1 | 9/2003 |
| WO | 9626511 A1 | 8/1996 |

OTHER PUBLICATIONS

Chinese Office Action issued in corresponding Chinese Patent Application No. 202310239329.2 dated Jan. 29, 2026, pp. 1-8.

* cited by examiner

MASS DETECTION DEVICE, MASS DETECTION SYSTEM, AND MASS DETECTION METHOD BASED ON MULTI-SENSOR SIGNAL FUSION

TECHNICAL FIELD

The present application relates to the technical field of mass detection, in particular to a mass detection device, system and method, and an electronic device.

BACKGROUND

With the popularity of global artificial intelligence scenarios, mechanical equipment has been widely used in assembly lines to replace workers in heavy physical labor, greatly improving social production efficiency. On the other hand, the mechanical equipment is also gradually popularized in ordinary households, such as intelligent sweeping robots, coffee machines, and meal delivery robots. Whether it is an industrial scene or a daily life scene, there is an issue of raw material supply in intelligent equipment. Therefore, it is necessary to detect the remaining amount of raw materials, so as to replenish them in time when the materials are short or nearly short, so as to avoid the waste of resources caused by the machine being unable to work due to the shortage of materials.

At present, solid materials are usually measured by piece counting, length counting and weight counting. For liquids and gases, volume calculation (or called flow calculation) and weight calculation are usually used for measurement. Generally, a volume sensor or a weight sensor is used for measurement.

Both volume detection sensors and weight detection sensors are linear devices, therefore its sensitivity is limited by the mechanism of the device itself. In addition, during a sensor sampling process, external factors such as mechanical vibration, ambient temperature, and material flow may affect a sampling precision.

SUMMARY OF INVENTION

The purpose of the present application is to improve a detection precision of material mass. To achieve this technical purpose, the present application adopts the following technical solutions.

In a first aspect, the present application provides a mass detection device, comprising:

a processor;

at least one sensor assembly, wherein the sensor assembly at least comprises a first sensor and a second sensor; the sensor assembly is configured to be connected to the processor and output a first sensing information and a second sensing information related to a mass of an object to be measured;

wherein the processor is configured to acquire the first sensing information and the second sensing information to determine an initially measured mass of the object to be measured by each sensor, and according to a comparison between a selected initially measured mass of the object to be measured and a first set threshold and a comparison between an absolute value of a difference in the initially measured mass of the object to be measured by each sensor and a second set threshold, to determine a final mass of the object to be measured.

In a preferred improvement, the first sensor comprises any one of an electromagnetic weighing sensor and a stress weighing sensor, and the second sensor comprises the other one of the electromagnetic weighing sensor and the stress weighing sensor.

In a preferred improvement, the first sensor and the second sensor at least comprise one electromagnetic weighing sensor, and the electromagnetic weighing sensor comprises:

a frequency generation module configured to generate a set frequency signal;

a first resonance module configured to generate a primary resonance signal based on the set frequency signal;

a second resonance module configured to be connected to the first resonance module through a coupling capacitor to generate a secondary resonance signal based on the primary resonance signal; wherein the second resonance module comprises a coil arranged in a Z direction, a ferrite is arranged in the coil, and a height of the coil is higher than the ferrite; the coil is capable of carrying a weight to be measured, so as to deform to change an eigenfrequency of the electromagnetic weighting sensor;

an echo collection and processing module configured to be connected to the second resonance module to collect the secondary resonance signal and output a voltage signal varying according to the eigenfrequency of the electromagnetic weighting sensor.

In a preferred improvement, the echo collection and processing module comprises a sampling unit, an operational amplification unit, and a voltage comparison unit;

wherein a current of the secondary resonance signal passes through the sampling unit, the operational amplification unit, and the voltage comparison unit in sequence, and outputs the voltage signal.

In a preferred improvement, the frequency generation module comprises a crystal oscillator, and the electromagnetic weighting sensor further comprises a microprocessor, a driving assembly, and a switching transistor assembly;

In a preferred improvement, the switching transistor assembly comprises a first switching transistor $Q_1$ and a second switching transistor $Q_2$, sources of the first switching transistor $Q_1$ and the second switching transistor $Q_2$ are connected to a common terminal;

wherein a drain of the first switching transistor $Q_1$ is connected to the first resonance module, and the drain of the first switching transistor $Q_1$ is connected to a direct current power supply;

wherein a drain of the second switching transistor $Q_2$ is connected to the second resonance module;

wherein a microprocessor is connected to the driving assembly, the driving assembly is respectively connected to the drain of the first switching transistor $Q_1$ and the drain of the second switching transistor $Q_2$, the driving assembly is further respectively connected to a gate control terminal of the first switching transistor $Q_1$ and a gate control terminal of the second switching transistor $Q_2$, so as to change the direct current power supply into a square wave with the same frequency as the crystal oscillator and input the square wave to the first resonance module and the second resonance module.

In a preferred improvement, the electromagnetic weighting sensor further comprises a microprocessor connected to an output terminal of the voltage comparison unit to receive the voltage signal and output a mass data of the object to be measured.

In a preferred improvement, the coil is a copper coil; a diameter of the coil ranges from 0.2 mm to 1 mm, and/or a number of turns of the coil ranges from 5 turns to 100 turns.

In a preferred improvement, the ferrite is a cylinder, a thickness of the ferrite ranges from 33% to 66% of a height of the coil in a relaxed state, and/or a diameter of the ferrite ranges from 4.5 mm to 48 mm.

In a preferred improvement, the sensor assembly further comprises:

a third sensor configured to acquire a third sensing information related to the mass of the object to be measured;

wherein the sensor assembly is further configured to output the third sensing information related to the mass of the object to be measured;

wherein the processor is further configured to acquire the third sensing information and determine the final mass of the object to be measured according to the first sensing information, the second sensing information, and the third sensing information.

In a preferred improvement, the third sensor comprises a volume sensor.

In a second aspect, the present application provides a mass detection system, comprising:

at least one the above mass detection device;

a cloud server;

wherein the mass detection device communicates with the cloud server.

In a third aspect, the present application provides a mass detection method, wherein the method is applied to the above mass detection device, and the method comprises:

acquiring the first sensing information and the second sensing information to determine an initially measured mass of the object to be measured by each sensor, and according to a comparison between a selected initially measured mass of the object to be measured and a first set threshold and a comparison between an absolute value of a difference in the initially measured mass of the object to be measured by each sensor and a second set threshold, to determine a final mass of the object to be measured.

In a preferred improvement, the method further comprises:

when the selected initially measured mass of the object to be measured is less than or equal to the first set threshold, the final mass of the object to be measured is determined based on the initially measured mass of the object to be measured by each sensor and a first preset condition;

wherein the first preset condition comprises:

in a case where an absolute value of a difference between an initially measured mass of the object to be measured by the first sensor and an initially measured mass of the object to be measured by the second sensor is less than or equal to the second set threshold, an average value of the initially measured mass of the object to be measured by the first sensor is taken as the final mass of the object to be measured.

In a preferred improvement, the first preset condition further comprises:

in a case where the absolute value of the difference between the initially measured mass of the object to be measured by the first sensor and the initially measured mass of the object to be measured by the second sensor is greater than the second set threshold and a variance of the initially measured mass of the object to be measured by the first sensor is less than or equal to a third set threshold, a minimum variance of the initially measured mass of the object to be measured by the first sensor within a unit time is taken as the final mass of the object to be measured.

In a preferred improvement, when the sensor assembly comprises a third sensor, the first preset condition further comprises:

in a case where the absolute value of the difference between the initially measured mass of the object to be measured by the first sensor and the initially measured mass of the object to be measured by the second sensor is greater than the second set threshold and when a standard deviation of the initially measured mass of the object to be measured by the first sensor is greater than the third set threshold, the final mass of the object to be measured is determined according to a current state, comprising:

when an absolute value of a difference between the mass of the initially measured mass of the object to be measured by the second sensor and a mass of the initially measured mass of the object to be measured by the third sensor is less than or equal to the third set threshold, a weighted value of the mass of the initially measured mass of the object to be measured by the second sensor and the mass of the initially measured mass of the object to be measured by the third sensor is taken as the final mass of the object to be measured;

when the absolute value of the difference between the mass of the initially measured mass of the object to be measured by the second sensor and the mass of the initially measured mass of the object to be measured by the third sensor is greater than the third set threshold, a minimum variance of the initially measured mass of the object to be measured by the second sensor within the unit time is taken as the final mass of the object to be measured.

In a preferred improvement, when the sensor assembly comprises a third sensor, the method further comprises:

when the selected initially measured mass of the object to be measured is greater than the first set threshold, the final mass of the object to be measured is determined based on the initially measured mass of the object to be measured by each sensor and a second preset condition;

wherein the second preset condition comprises:

in a case where an absolute value of a difference between an initially measured mass of the object to be measured by the second sensor and an initially measured mass of the object to be measured by the third sensor is less than or equal to a fourth set threshold, a weighted value of the mass of the initially measured mass of the object to be measured by the second sensor and the mass of the initially measured mass of the object to be measured by the third sensor is taken as the final mass of the object to be measured;

in a case where an absolute value of a difference between the initially measured mass of the object to be measured by the second sensor and the initially measured mass of the object to be measured by the third sensor is greater than the fourth set threshold, an average value of the initially measured mass of the object to be measured by the second sensor is taken as the final mass of the object to be measured;

in a case where the absolute value of the difference between the initially measured mass of the object to be measured by the second sensor and the initially measured mass of the object to be measured by the third sensor is greater than the fourth set threshold and the absolute value of the difference between the initially measured mass of the object to be measured by the first sensor and the initially measured mass of the object to be measured by the second sensor is greater than the second set threshold, a weighted value of the mass of the initially measured mass of the object to be measured by the first sensor and the mass of the initially measured mass of the object to be measured by the second sensor is taken as the final mass of the object to be measured.

In a fourth aspect, the present application provides an electronic device, comprising: the above mass detection device.

Beneficial Technical Effect Obtained by the Present Application

The mass detection device provided by the present application includes a first sensor and a second sensor, and it can be determined whether there is abnormality and noise in the device according to the difference between the measured results of the two sensors and the preset threshold. When it is preliminarily determined that there is noise, the final mass is determined based on the preliminarily measured mass of the object to be measured by the two sensors. The present application can avoid an issue that precision may not be high when one sensor is used for measurement and can improve an overall detection precision of the device.

Different from the conventional single volume sensor detection method, the present application is based on a variety of detection methods that are completely independent of each other, and through online analysis and calibration to achieve high-precision detection of the mass of the material to be measured (such as gas/liquid). The method includes: first, the detection result of the volumetric method itself; second, the weight detection result given by the weight sensor; third, the weight detection result given by the electromagnetic weighting sensor. Because the three methods completely detect independent physical quantities, and finally jointly realize the detection of gas/liquid mass, the final detection precision can be greatly improved.

The mass detection device, system and method provided in the present application can be applied to different material environments, can weaken an impact of vibration and temperature changes, and can improve mass detection precision.

The electromagnetic weighing sensor used in the mass detection device provided by the present application has high sensitivity, high detection precision, good adaptability to the application environment, and is convenient for popularization and application.

The electronic device provided in the present application is equipped with a mass detection device, and the detection precision is improved.

BRIEF DESCRIPTION OF THE DRAWINGS

The drawings described herein are for illustration purposes only and are not intended to limit the scope of the present disclosure in any way. In addition, shapes and proportional dimensions of components in the drawings are only schematic and are used to help the understanding of the present application, and do not specifically limit the shapes and proportional dimensions of the various components of the present application. Under the teaching of the present application, those skilled in the art can select various possible shapes and proportional dimensions according to specific situations to implement the present application. In the drawings.

REFERENCE NUMERAL

Figure 1:
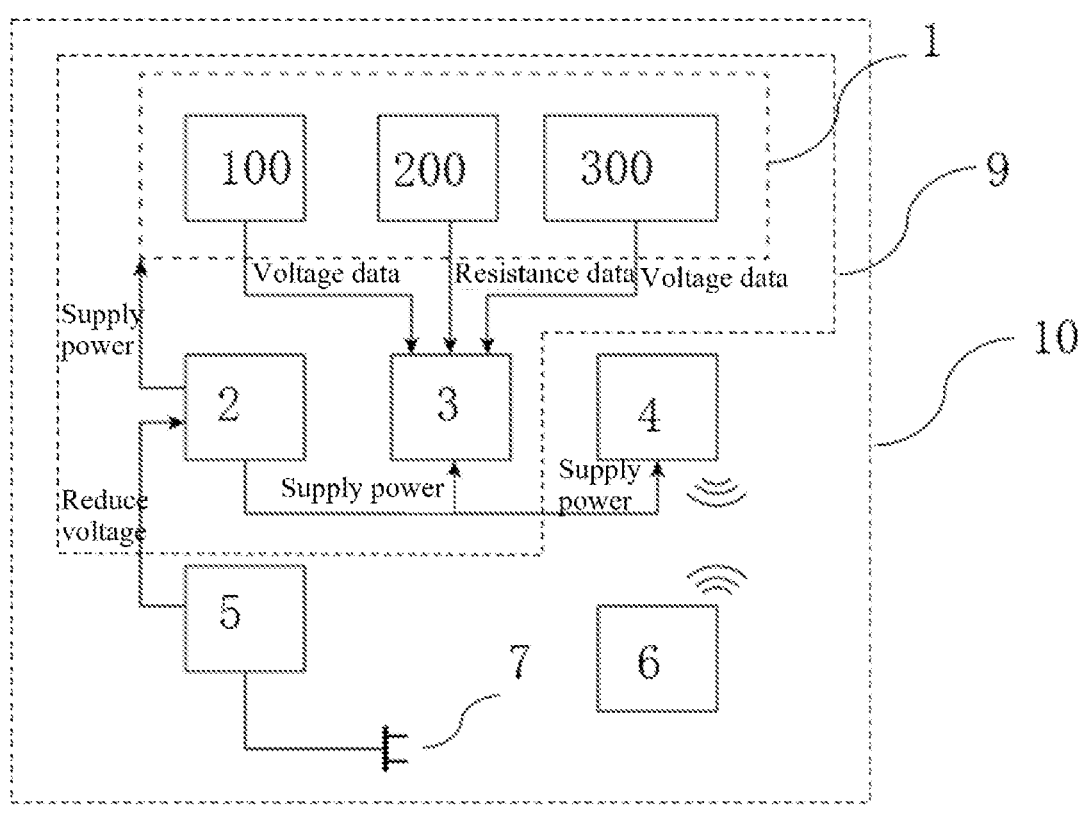
FIG. 1 is a frame diagram of a mass detection device according to an embodiment of the present application.

1—Sensor component, 2—Power supply module, 3—Processor, 4—Communication module, 5—Adapter, 6—Cloud server, 7—220V 50 Hz electricity, 8—AD conversion module, 9—Mass detection device, 10—Mass detection system, 11—Electronic device, 100—Electromagnetic weighting sensor, 200—Stress weighting sensor, 300—Volume sensor, 110—Frequency generation module, 120—First resonance module, 121—Inductance, 122—First capacitor, 130—Second resonance module, 131—Coil, 132—Equivalent resistance, 133—Second capacitor, 140—Echo collection and processing module, 150—Coupling capacitor, 160—Power conversion module, 170—Ferrite, 171—Cylinder, 172—Strain gauge, 173—Frame, 180—Microprocessor, 190—Driving assembly, 191—Switching transistor assembly, 192—Direct current power supply.

DETAILED DESCRIPTION OF ILLUSTRATED EMBODIMENTS

In order to enable those skilled in the art to better understand the technical solutions in the present application, the technical solutions in the embodiments of the present application will be clearly and completely described below in conjunction with the drawings in the embodiments of the present application. Apparently, the described embodiments are only some of the embodiments of the present application, not all of them. Based on the embodiments in the present application, all other embodiments obtained by persons of ordinary skill in the art without making creative efforts shall fall within the scope of protection of the present application.

Those skilled in the art can understand that terms such as "first", "second", and "third" in the embodiments of the present disclosure are only used to distinguish objects such as as different steps, devices, or modules. This does not imply any specific technical meaning, nor does it imply a logical order between them.

It should also be understood that in the embodiments of the present disclosure, "plurality" may refer to two or more than two, and "at least one" may refer to one, two, or more than two.

Throughout the specification and claims, when it is described that an element is "connected" to another element, the element may be "directly connected" to the other element, or "electrically connected" to the other element through a third element.

Furthermore, the word "comprising" will be understood as meaning the inclusion of elements but not the exclusion of any other elements, unless explicitly described to the contrary.

Techniques, methods, and devices known to those of ordinary skill in the related art may not be discussed in detail, but where appropriate, such techniques, methods, and devices should be considered part of the description.

The traditional volume method is mainly aimed at wherein the measurement value is only the volume unit, and there are generally two calculation methods. The first type can calculate the remaining materials by calculating the used materials by fixing the mentioned structural components. This method can only be used based on the amount of fixed structural parts. The other is to calculate the gas/liquid flow through the pipeline in real time through the flow meter.

However, no matter which method is used for measurement, what is finally obtained is the volume parameter used by the material in the device. Usually, the unit of measurement in gas/liquid storage and tank containers is mass, and the density calculation formula must be used in the process from mentioning to mass calculation:

$$m=\rho*V$$

$\rho$ is the gas/liquid density, m is the mass, and V is the measured volume.

As we all know, the density of gas/liquid may change greatly with the change of temperature, so the above measurement method is not suitable for the scene with high precision requirement.

Similarly, mass measurement is usually done by gravimetric test, then according to the formula:

$$m=G/g$$

G is the measured gravity, m is the mass, and g is the gravitational acceleration 9.8 N/kg.

The working principle of the gravimetric sensor is that the strain gauge, the core component of the sensor, is deformed by gravity. According to the size of the deformation, it is converted into a resistance value, and then the high-precision weight detection is realized by testing the change of the resistance value. Similarly, because the strain gauge is a completely solid metal structure, thermal expansion may also cause precision deviation.

In the prior art, volume sensors or weight sensors are generally used to detect the quality of materials. However, no matter the volume detection sensor or the weight detection sensor is a linear device, the sampling precision is easily affected.

In order to improve the precision of mass detection, the embodiment of the present application provides a mass detection device 9, a mass detection system 10, a mass detection method, and an electronic device 11.

The following description of at least one exemplary embodiment is merely illustrative in nature and in no way intended as any limitation of the disclosure, its application or uses.

An embodiment of the present application provides a mass detection device 9, including:

a processor 3;

at least one sensor assembly 1, wherein the sensor assembly 1 at least comprises a first sensor and a second sensor; the sensor assembly 1 is configured to be connected to the processor 3 and output a first sensing information and a second sensing information related to a mass of an object to be measured;

wherein the processor 3 is configured to acquire the first sensing information and the second sensing information to determine an initially measured mass of the object to be measured by each sensor, and according to a comparison between a selected initially measured mass of the object to be measured and a first set threshold and a comparison between an absolute value of a difference in the initially measured mass of the object to be measured by each sensor and a second set threshold, to determine a final mass of the object to be measured.

It can be understood that the sensor assembly 1 can be an integral structure or can be a separate structure of the first sensor and the second sensor. The first sensor and the second sensor are connected to the processor 3 and transmit sensing information independently.

The mass detection device 9 provided in the embodiment of the present application can select the initially measured mass of the object to be measured by one of the sensors from any of the first sensor and the second sensor and compare it with the first set threshold.

The first set threshold can be set according to specific application scenarios or needs. As in the specific embodiment, the mass detection device 9 is applied to the application scenario of detecting the remaining amount of raw materials. Then the first set threshold is related to the preset material mass value and can be set as a certain proportion of the preset material mass value. Comparing the initially measured mass of the object to be measured by one of the sensors with the first set threshold value, it can be determined whether the remaining quantity of the object is in a low state.

By comparing the absolute value of the difference between the initially measured mass of the object to be measured by the first sensor and the second sensor with the second set threshold, it can be determined whether there is abnormal oscillation and noise in the whole device. If the absolute value of the difference between the two is too large, it means that there is abnormal oscillation and noise in the whole device. At this time, the initially measured mass of the object to be measured by the sensor with higher detection precision can be selected as the final mass, or the weighted value of the measured initially mass of the object to be measured by the two sensors can be calculated as the final mass, etc.

The mass detection device 9 provided in the embodiment of the present application uses at least one sensor assembly 1. The sensor assembly 1 includes at least a first sensor and a second sensor. The present application determines whether there is abnormality and noise in the device by comparing the difference between the two sensors to measure the mass of the object to be measured. When it is preliminarily determined that there is noise, the final mass is determined based on the initially measured mass of the object to be measured by the two sensors. The present application can avoid the issue that the precision may not be high when one sensor is used for measurement and can improve the detection precision of the whole device.

In a specific embodiment, if the sensors are all of the same type, the detection precision may be affected due to the same characteristics of the sensors in the sensor assembly 1. Optionally, the first sensor and the second sensor adopt different types of sensors, such as the first sensor includes any one of the electromagnetic weighting sensor 100 and the stress weighting sensor 200, and the second sensor includes the other of the electromagnetic weighting sensor 100 and the stress weighting sensor 200. Or the first sensor and the second sensor at least comprises one electromagnetic weighting sensor.

The electromagnetic weighting sensor 100 is a sensor used to convert the mass signal of the measured object into induced electromotive force, and the electromagnetic weighting sensor in the prior art can be used in the present application.

The stress weighting sensor 200, also known as strain gauge weighting sensor, can be divided into normal stress type (measuring tensile, compressive, and bending stress) and shear stress type (measuring the two main stresses produced by shear stress) according to the said parameters. Optionally, a specific embodiment may use a resistance strain type weighting sensor in the prior art.

The working principle of the resistance strain weighting sensor is wherein the elastic body (elastic element, sensitive beam) produces elastic deformation under the action of external force, so that the resistance strain gauge (transfer element) pasted on its surface also deforms. After the resistance strain gauge is deformed, its resistance value may change (increase or decrease). Then the resistance change is converted into an electrical signal (voltage or current) by the corresponding measuring circuit, thus completing the process of converting the external force into the electrical signal.

Refer to FIG. 1, as shown in FIG. 1, in this embodiment, optionally, the mass detection device 9 further includes a power supply module 2. The power supply module 2 is connected with the sensor assembly 1 and the processor 3 for providing power. The power supply module 2 can be a mobile power supply (it can be a battery), or a power socket connected to the grid, or a direct current step-down regulated power supply module, etc.

The mass detection device 9 may also include an adapter 5. The input of the adapter 5 is 220V 50 Hz mains 7, and the output is 12V/24V direct current power first entering the power supply module 2. The 12/24V direct current is continuously stepped down to 3.3V and 5V by using the power supply module 2 for the sensor hardware, the processor 3, the communication module 4 or other optional modules to work.

In some optional implementation manners of the embodiments of the present disclosure, the mass detection device 9 further includes a communication module 4. The communication module 4 is connected with the processor 3 to communicate with the cloud server 6 or other mass detection devices 9 through the communication module 4 to complete data interaction. The communication module 4 includes but not limited to 2g/3g/4g/5g module, wifi module, zigbee module, lora, nb-iot, bluetooth and so on.

It can be understood that, in other embodiments, on the basis of the above embodiments, the mass detection device 9 can also include a display module, a voice module, etc., except that the communication module 4 can be used to realize data communication with other device, and the display module and the voice module can be connected with the processor 3 to realize functions such as data display and voice input playback. The display module can be a display screen, such as a touch display screen.

Figure 2:
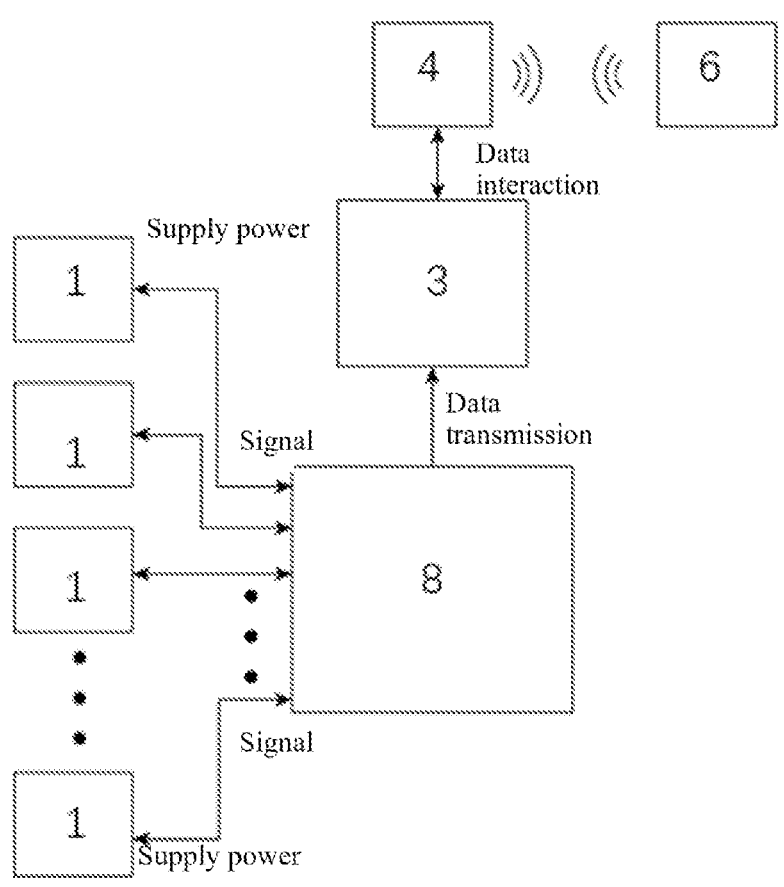
FIG. 2 is a frame diagram of a mass detection device according to another embodiment of the present application.

Optionally, as shown in FIG. 2, in some optional implementation manners of the embodiments of the present disclosure, the adopted processor 3 does not have a built-in analog-to-digital conversion module, or the built-in analog-to-digital conversion module cannot meet the requirements. The mass detection device 9 also includes an AD conversion module 8 (called an analog to digital converter, a/d converter or adc for short).

The AD conversion module 8 is respectively connected with the sensor assembly 1 and the processor 3 to convert the analog sensory information with continuous time and continuous amplitude into a digital signal with discrete time and discrete amplitude and transmit it to the processor 3.

In some optional implementation manners of the embodiments of the present disclosure, the power supply module 2 may also be integrated into the AD conversion module 8, which is a prior art and will not be described again.

In some optional implementation manners of the embodiments of the present disclosure, optionally, the sensor assembly 1 further comprises a third sensor; wherein the sensor assembly 1 is further configured to output the third sensing information related to the mass of the object to be measured;

wherein the processor 3 is further configured to acquire the third sensing information and determine the final mass of the object to be measured according to the first sensing information, the second sensing information, and the third sensing information.

As shown in FIG. 1, the third sensor includes a volume sensor 300.

The sensor assembly 1 shown in FIG. 2 includes an electromagnetic weighting sensor 100, a stress weighting sensor 200, and a volume sensor 300 (gas volume sensor or liquid volume sensor). In this embodiment, when the mass detection device 9 is working, the volume sensor 300 is located at the output end of the material to complete the volume detection. The electromagnetic weighting sensor 100 and the stress weighting sensor 200 are located under the material storage tank to complete the mass detection. The electromagnetic weighting sensor 100 feeds back voltage data, the stress weighting sensor 200 feeds back resistance data, and the volume sensor 300 feeds back voltage data. The processor 3 makes a determination instruction after processing the three items of data through the AD conversion module 8. If there is a lack of material in the detection feedback or a large deviation between the volume value and the mass value, there may be leakage, and a warning is sent to the cloud server 6 through the communication module 4.

In some embodiments, the mass detection device 9 and the cloud server 6 can constitute a mass detection system 10. The mass detection device 9 and the cloud server 6 can communicate with each other. When the mass detection system 10 is working normally, the communication module 4 may also perform data interaction with the cloud server 6 within a fixed time period to update the usage of the measured materials in real time.

Based on the above solution description, the sensor assembly 1 in the mass detection device 9 can integrate three sensors: an electromagnetic mass detection 100, a stress mass detection 200, and a volume sensor 300 (gas volume sensor or liquid volume sensor). The sensor assembly 1 forms a single integrated sensor. The analog signal can be converted into a digital signal by the AD conversion module 8 and then transmitted to the processor 3 in a unified manner. If there is a lot of detection information in the mass detection system 10, or complex processing is required, the processor 3 can also be replaced with a microcomputer to realize data processing, storage, uploading, and instruction issuance.

In the embodiment shown in FIG. 2, the sensor assembly 1 is integrated with various sensors as an integral module. The sensing information obtained by each sensor is independent. The processor 3 can select the initially measured mass of the object to be measured that is by the required sensor. Each sensor assembly 1 can be set with an independent mass range or volume range so as to meet the detection requirements of different kinds of materials. The whole device can include multiple sensor assemblies 1, and each sensor assembly 1 can be arranged at different test points, so the application is more flexible.

Figure 3:
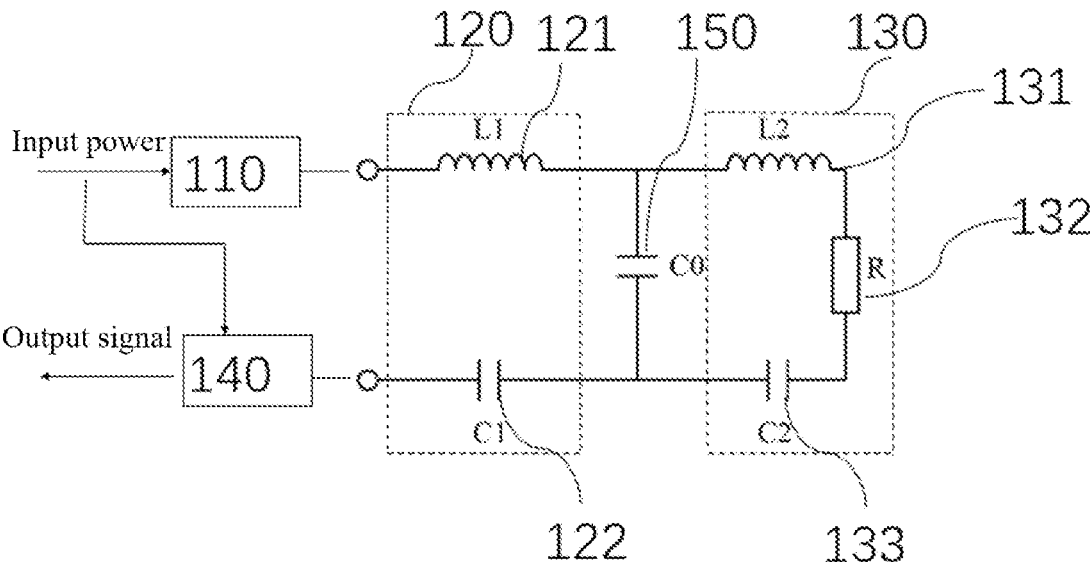
FIG. 3 is an equivalent schematic diagram of an electromagnetic weighting sensor according to an exemplary embodiment of the present application.

FIG. 3 is an equivalent schematic diagram of an electromagnetic weighting sensor 100 according to an exemplary embodiment of the present application. In some optional implementations of embodiments of the present disclosure, as shown in FIG. 3, the electromagnetic weighting sensor 100 includes:

a frequency generation module 110 configured to generate a set frequency signal;

a first resonance module 120 configured to generate a primary resonance signal based on the set frequency signal;

a second resonance module 130 configured to be connected to the first resonance module 120 through a coupling capacitor to generate a secondary resonance signal based on the primary resonance signal; wherein the second resonance module 130 comprises a coil 131 arranged in a Z direction, a ferrite 170 is arranged in the coil 131, and a height of the coil 131 is higher than the ferrite 170; the coil 131 is capable of carrying a weight to be measured, so as to deform to change an eigenfrequency of the electromagnetic weighting sensor 100;

an echo collection and processing module 140 configured to be connected to the second resonance module 130 to collect the secondary resonance signal and output a voltage signal varying according to the eigenfrequency of the electromagnetic weighting sensor 100.

The frequency generation module 110 is used to generate a fixed frequency signal. The first resonance module 120 generates an oscillation signal. Exciting the coil 131 in the second resonance module 130 with a high-frequency current can generate a high-frequency current with a certain frequency corresponding to the weight to be measured. The output voltage of the excitation current of the coil 131 is generated by the echo collection and processing module 140.

In some specific embodiments, the frequency generation module 110 may use, but is not limited to, a crystal oscillator with a fixed frequency. In other embodiments, the frequency generation module 110 may adopt a high-precision RC circuit, or an internal output of an MCU (micro control unit) with sufficient precision. The advantages of the crystal oscillator are high frequency precision and good temperature stability. In the present application, the precision of the frequency generation module 110 may directly depend on the precision of the electromagnetic weighting sensor 100.

Figures 4, 5:
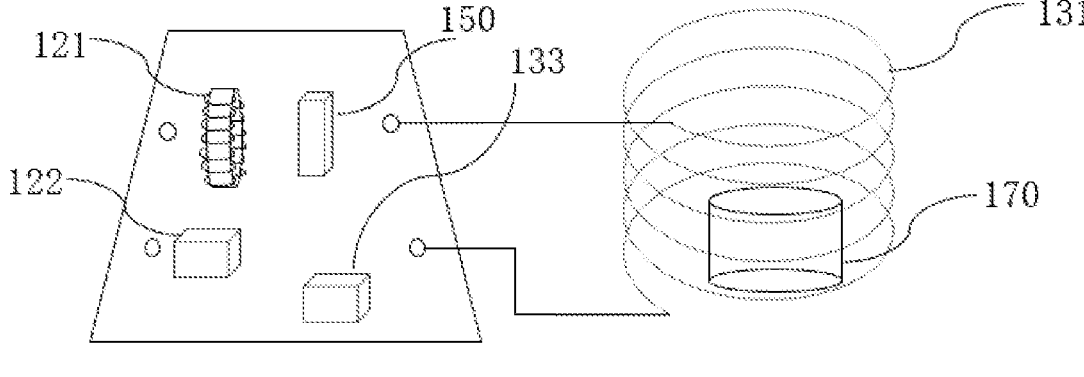
FIG. 4 is a schematic diagram of an electromagnetic coupling hardware topology of an electromagnetic weighting sensor according to an exemplary embodiment of the present application.
FIG. 5 is an equivalent schematic diagram of an electromagnetic weighting sensor according to another exemplary embodiment of the present application.

After the frequency generation module 110 (such as a crystal oscillator) is powered on, it transmits a fixed-frequency square wave signal to the back-end electromagnetic coupling hardware topology (the electromagnetic coupling hardware topology includes the first resonance module 120 and the second resonance module 130). The transmission frequency is determined by the frequency of the electromagnetic coupling hardware topology built in the backend. The square wave signal is reflected back to the echo collection and processing module 140 after passing through the electromagnetic coupling hardware topology. After being processed by the echo collection and processing module 140, the output voltage signal is used to calibrate the mass of the detection target. The equivalent schematic diagram of the electromagnetic coupling hardware topology is shown in FIG. 4.

Optionally, the upper end of the coil 131 can move along the Z direction, that is, deform with the weight bearing, and the lower end of the coil 131 is fixed.

The electromagnetic weighting sensor provided in the present application realizes deformation after bearing weight through the coil 131 arranged in the Z direction. The inductance of the coil 131 is used as the deformation strain of the weight bearing, and further affects the local vibration frequency of the electromagnetic weighting sensor.

In a specific embodiment, the echo collection and processing module 140 may include a rectification circuit and a filter circuit, and then amplified to a proper ratio through an operational amplifier.

Figure 7:
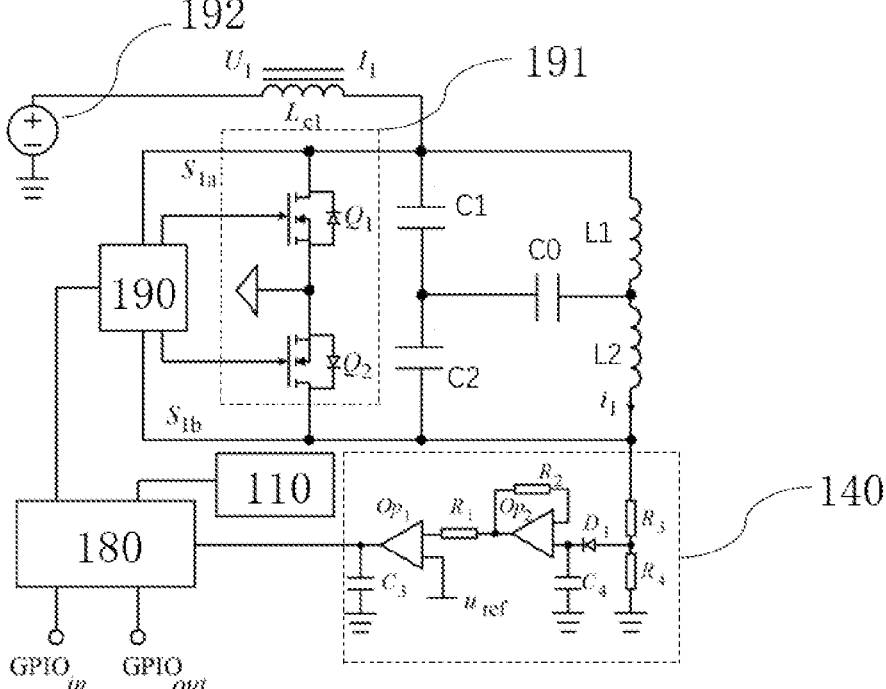
FIG. 7 is a schematic diagram of the principle of an echo collection and processing module of an electromagnetic weighting sensor according to an exemplary embodiment of the present application.

In some embodiments, as shown in FIG. 7, the echo collection and processing module 140 includes a sampling unit, an operational amplification unit, and a voltage comparison unit.

The sampling unit includes a third resistor $R_3$ and a fourth resistor $R_4$. A node on a connection line between the third resistor $R_3$ and the fourth resistor $R_4$ is input to an input terminal of a second operational amplifier $Op_2$ after passing through a diode $D_1$. The other input terminal of the second operational amplifier $Op_2$ is input to the output terminal of the second operational amplifier $Op_2$ through the second resistor $R_2$. The output terminal of the second operational amplifier $Op_2$ is input to an input terminal of the first operational amplifier $Op_1$ through the first resistor $R_1$. Another input terminal of the first operational amplifier $Op_1$ inputs a reference voltage $u_{ref}$, and an output terminal of the first operational amplifier $Op_1$ outputs a voltage signal.

The current $i_1$ of the secondary resonance signal is directly coupled through the coil 131 and then divided by two precision resistors, the third resistor $R_3$ and the fourth resistor $R_4$. Afterwards, it is rectified by the diode $D_1$ and filtered by the capacitor $C_4$ and input to the second operational amplifier $Op_2$. The second operational amplifier $Op_2$ is responsible for amplifying the voltage, and the amplification factor is controlled by two resistors, the first resistor $R_1$ and the second resistor $R_2$. After that, the signal enters the first operational amplifier $Op_1$ for zero-crossing comparison to remove the clutter signal, and Uref is the reference voltage for comparison. Finally, the voltage signal is output after being filtered by the capacitor $C_3$. Optionally, the output voltage can be connected to the microprocessor 180.

In some embodiments, optionally, as shown in FIG. 7, the electromagnetic weighting sensor 100 further includes a microprocessor 180. The microprocessor 180 is connected with the output end of the voltage comparison unit to receive the voltage signal and output the mass data. The microprocessor 180 can be implemented using existing technologies and will not be described in detail.

In some embodiments, as shown in FIG. 7, the frequency generation module 110 includes a crystal oscillator, and the electromagnetic weighting sensor 100 also includes a microprocessor 180, a driving assembly 190, and a switching transistor assembly 191;

wherein the switching transistor assembly 191 comprises a first switching transistor $Q_1$ and a second switching transistor $Q_2$, sources of the first switching transistor $Q_1$ and the second switching transistor $Q_2$ are connected to a common terminal;

wherein a drain of the first switching transistor $Q_1$ is connected to the first resonance module 120, and the drain of the first switching transistor $Q_1$ is connected to a direct current power supply 192;

wherein a drain of the second switching transistor $Q_2$ is connected to the second resonance module 130;

wherein a microprocessor 180 is connected to the driving assembly 190, the driving assembly 190 is respectively connected to the drains of the first switching transistor $Q_1$ and the second switching transistor $Q_2$ and the gate control terminals of the first switching transistor $Q_1$ and the second switching transistor $Q_2$, so as to change the direct current power supply 192 into a square wave with the same frequency as the crystal oscillator and input it to the electromagnetic coupling hardware topology (including the first resonance module 120 and the second resonance module 130).

The driving assembly 190 mainly converts the signal of the transmitting end of the microprocessor 180 into a driving signal capable of driving the MOSFET. The first switching transistor $Q_1$ and the second switching transistor $Q_2$ are two MOSFETs. The inverter topology in FIG. 7 is Double-Class-E high-frequency inverter topology, which is characterized by zero-voltage (Zero-Voltage-Switch, ZVS) inverter switch, low loss and high-frequency inverter without distortion. In this embodiment, the fixed frequency is generated by the crystal oscillator and input to the microprocessor 180, after processing, a PWM wave is generated and supplied to the driving assembly 190. At present, the wave output by the MCU can only reach the mw level. The circuit provided by the embodiment of the present application includes the microprocessor 180, the switching transistor assembly 191 and the driving assembly 190, which can output W-level power. In this embodiment, because the driving power is increased, it is less affected by environmental disturbances, thereby improving detection precision.

In FIG. 7, the inductance Lc1 is mainly responsible for energy supply and filtering for the freewheeling inductance of the transmitter.

The microprocessor 180 can output the detection signal or update the analysis method through the GPIO input/output port.

In a specific embodiment, the first resonance module 120 may use an existing oscillating circuit, and in some embodiments, for example, an LC oscillator may be used.

In a specific embodiment, the coil 131 is wound in a spiral shape, and a ferrite 170 is arranged in the middle, which can reduce the leakage magnetic field and improve the sensitivity of the sensing device. The height of the coil 131 is higher than the height of the ferrite 170. The coil 131 needs to carry the weight of the material to be processed so that the eigenfrequency of the mass detection device 9 changes after deformation occurs.

In the embodiment shown in FIG. 3, FIG. 4, and FIG. 5, the first resonance module 120 of the electromagnetic weighting sensor 100 adopts an LC oscillating circuit. The operation frequency of the system is a fixed frequency. The principle of the electromagnetic weighting sensor 100 provided in the present application is that the voltage of the original frequency changes because the eigenfrequency of the LC in the electromagnetic coupling hardware topology shifts from the original frequency. The conversion ratio between voltage and mass is roughly determined by the second resonance module 130, that is, the amplitude of the LC resonance circuit in the LC resonance circuit in which the coil 131 works.

FIG. 3 shows that the electromagnetic weighting sensor 100 is composed of two sets of LC resonance circuits (first resonance module 120 and second resonance module 130) connected in series. The coupling between the two groups of LCs is completed through a coupling capacitor 150 (capacitor C0 in the figure). The electromagnetic coupling hardware topology is shown in FIG. 3 and the right part of FIG. 5 and FIG. 4.

Specifically, optionally, the first resonance module 120 includes an inductor 121 and a first capacitor 122. The second resonance module 130 includes a coil 131 and a second capacitor 133. A first end of the inductor 121 is connected to the frequency generation module 110, and a second end of the inductor 121 is connected to the first end of the coil 131. The second end of the coil 131 is connected to the first end of the second capacitor 133. One end of the first capacitor 122 is connected to the second end of the second capacitor 133, and the other end of the first capacitor 122 is connected to the echo collection and processing module 140.

The node on the connecting line between the inductor 121 and the coil 131 and the node on the connecting line between the first capacitor 122 and the second capacitor 133 are coupled through the coupling capacitor 150.

As shown in FIG. 3 and FIG. 5, disposing the ferrite 170 in the coil 131 can be equivalent to connecting an equivalent resistor 132 in series in the circuit of the coil 131.

The intrinsic resonance frequency $\omega$ of the two resonance circuits can be obtained by formula (I), expressed as follows:

$$\omega = 1/2\pi\sqrt{LC} \tag{I}$$

Set $$L = L_{11} = L_{22}, \frac{1}{c} = \frac{1}{c_{11}} + \frac{1}{c_{00}} = \frac{1}{c_{22}} + \frac{1}{c_{00}}$$

in the system, to ensure that the two resonance circuits have the same intrinsic resonance frequency in the initial state of the system. $L_{11}$ and $L_{22}$ are the inductance values of the inductors in the two resonance circuits respectively. $C_{11}$ and $C_{22}$ are the capacitance values of the capacitors in the two resonance circuits respectively. $C_{00}$ is the coupling capacitance between the two resonance circuits.

In order to simplify the model, physical quantities are used instead of electrical quantities to describe the system. At this time, the motion equations of the two resonant circuits in the system can be described as formula (II), expressed as follows:

$$\frac{d\tilde{a}_1}{dt} = (i\omega_1 - \gamma)\tilde{a}_1 - i\kappa\tilde{a}_2 + \sqrt{2\gamma}\,S_{in}e^{-i\omega t} \tag{II}$$

$$\frac{d\tilde{a}_2}{dt} = (i\omega_2 - \gamma)\tilde{a}_2 - i\kappa\tilde{a}_1$$

$\tilde{a}_{1,2}=A_{1,2}e^{-i\omega t}$ describes the medium current oscillation state of the two resonance circuits. $\omega_{1,2}=\omega_0$ is the eigenfrequency of the two resonant circuits. $\omega$ is the frequency of crystal oscillator input. $\gamma$ is the system loss rate determined by the back-end equivalent resistance R. The relationship is $\gamma=R/2L$. $S_{in}$ is the voltage amplitude at the input. i is a symbol of a complex number. $\kappa$ represents the near-field coupling strength or near-field coupling coefficient of the first resonant tank and the second resonant tank. The expression is $\kappa=k_0*\sqrt{L_{11}*L_{22}}$, where $k_0$ is the capacitive coupling coefficient.

By rewriting the system motion equation, the system Hamiltonian matrix can be further obtained, expressed as formula (III).

$$H = \begin{pmatrix} \omega_1 + i\gamma & \kappa \\ \kappa & \omega_2 - i\gamma \end{pmatrix} \quad \text{(III)}$$

By solving the determinant of the matrix H, the eigenmodes of the system can be further obtained, expressed as formula (IV).

$$\omega_{\pm} = \frac{\omega_1 + \omega_2}{2} \pm \sqrt{\kappa^2 + \left(\frac{\omega_1 - \omega_2 + 2i\gamma}{2}\right)^2} \quad \text{(IV)}$$

When considering $\omega_{1,2}=\omega_0$, the above formula (IV) can be written as:

$$\omega_{\pm} = \omega_0 \pm \sqrt{\kappa^2 - \gamma^2} \quad \text{(V)}$$

When the equivalent resistance R is properly adjusted to adjust the loss, the system can be in a critical coupling state, that is, $\sqrt{\kappa^2-\gamma^2}\approx0$. This application uses the sensitivity near the critical coupling to improve the detection sensitivity. Here, the inductance (the inductance value is $L_{22}$) in the second resonant tank is used as the weight bearing deformation strain. When introduced into the system, a perturbation $\Delta\omega$ is added corresponding to the eigenfrequency $\omega_2$, then the formula (IV) can be further rewritten as:

$$\omega_{\pm} = (\omega_0 + \Delta\omega) \pm \sqrt{\kappa^2 + \left(\frac{\omega_0 + \Delta\omega + 2i\gamma}{2}\right)^2} \quad \text{(VI)}$$

Further solving can get the relationship of $\omega_{\pm}\sim\sqrt{\Delta\omega}$ to the power of ½, then for subtle changes, this precision may be further amplified.

In summary, the electromagnetic weighting sensor 100 provided by the present application is very suitable as a solution to improve the detection precision and sensitivity requirements of the system.

The embodiment is constructed according to a theoretical model, wherein the electromagnetic coupling hardware topology in the electromagnetic weighting sensor 100 is shown in FIG. 1. Inductor 121 (L1), coupling capacitor 150 (C0), first capacitor 122 (C1), and second capacitor 133 (C2) are lumped elements, and coil 131 (L2) is a wound flexible coil assembly with a certain height in the middle The ferrite 170 increases the contrast of the sensing device by increasing the variation range of the inductance L2 of the coil 131 after deformation. In a specific embodiment, the height of the coil 131 must be higher than the ferrite 170 (or called the iron core) by a certain distance.

In consideration of overall sensitivity and stability, optionally, in some embodiments, the coil 131 is a copper wire with a diameter of 0.2 mm-1 mm. Copper wires of 0.2 mm, 0.5 mm, or 1 mm diameter are optionally used. The number of spiral winding turns depends on the specific size, ranging from 5 turns to 100 turns, and can be selected from 5 turns, 8 turns, 20 turns, 50 turns, or 100 turns.

In order to balance the space size and magnetic field strength requirements, optionally, the diameter of the wound spiral is controlled at 5 mm~50 mm, such as 5 mm, 10 mm, 15 mm, 20 mm, 25 mm, 30 mm, 35 mm, 40 mm, 45 mm, 50 mm.

Because the ferrite 170 is built into the spiral structure of the coil 131, the diameter of the ferrite 170 is smaller than the diameter of the spiral, and the diameter of the ferrite 170 is 4.5 mm~48 mm, such as 4.5 mm, 5 mm, 10 mm, 15 mm, 20 mm, 25 mm, 30 mm, 35 mm, 40 mm, 45 mm, 48 mm.

In a specific embodiment, combined with the mass range to be detected and the detection sensitivity requirements, the thickness of the ferrite 170 is controlled at 33%-66% of the height of the coil 131 in the diastolic state, such as 33%, 40%, 50%, or 66% of the height of the coil 131 in the diastolic state.

When there is no load, the height h of the coil 131 is 7.4 mm, and the inductance L2 of the coil 131 is 0.065 uH. After the load is deformed, the height h of the coil 131 can vary from 6 mm to 7.4 mm, and the inductance L2 of the coil 131 can vary from 0.065 uH to 0.09 uH. The final feedback shows that the range of deformation mass is 0~146 kg, and the normal working range is set at 0~50 kg.

The parameters of other components in the system are set as L1=L2=0.065 uH under no load, C1=C2=6.8 nF, C0=2.2 nF. The final design operating frequency is 13.56 MHz, and the input is provided by a fixed crystal oscillator. When the weight of the system changes, the height h of the strain flexible coil 131 changes, resulting in a change in the inductance L2 of the coil 131. Then the frequency drift of the corresponding system @2 causes the input reflection of fixed $\omega_0$=13.56 MHz to increase. The voltage value output by the echo collection and processing module 140 increases. Finally, this signal can be fed back to the microprocessor 180 to realize the result of the quality test.

In some embodiments, the electromagnetic weighting sensor 100 may include a power conversion module 160, as shown in FIG. 5. When the system power is input, the power conversion module 160 may reduce the input 5/9/12V direct current voltage to 3.3/5V voltage to supply power to the frequency generation module 110 (such as a crystal oscillator) and the echo collection and processing module 140.

By arranging the power conversion module 160 in the electromagnetic weighting sensor 100, the range of the input power voltage can be expanded, and the power supply voltage stabilization and filtering can be realized. This makes the whole device more adaptable and reliable.

The electromagnetic weighting sensor 100 provided in this application is the same as the traditional stress sensor, and finally obtains the voltage value (the principle of the traditional stress sensor is that the stress changes the resistance, and the final voltage is fed back through the resistance change (such as designing a voltage divider circuit). In this application, under a fixed frequency, the coil 131 is assembled into a resonant voltage in the LC, and the voltage value is obtained through voltage mutual inductance. If the pressure on the coil 131 in the sensing device is greater, the LC frequency shifts more seriously, and the resonance voltage becomes lower. At this time, an alternating current signal is obtained, which can be converted into a direct current signal after rectification and filtering, and then amplified by an operational amplifier to obtain a voltage signal output.

Figure 6:
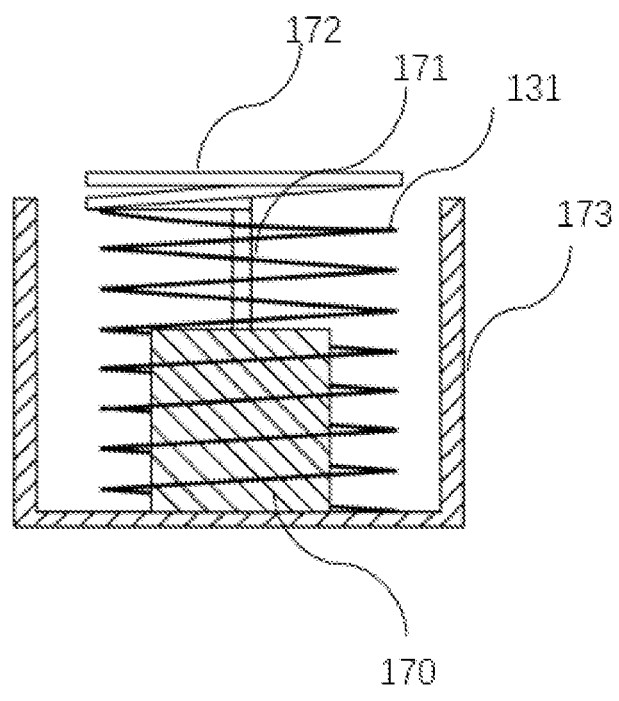
FIG. 6 is a schematic diagram of a coil arrangement of an electromagnetic weighting sensor according to an exemplary embodiment of the present application.

In other embodiments, as shown in FIG. 6, a strain gauge 172 may be provided on the upper end of the coil 131. The strain gauge 172 can be made of non-magnetic response materials (engineering plastics, carbon fiber or ceramics, etc.), and the strain gauge 172 has a certain deformation structure after bearing a force. When selecting the strain gauge 172, it should be noted that its Young's modulus is within a reasonable range. Optionally, the strain gauge 172 and the coil 131 can be connected through a slot or glued together.

In some embodiments, in order to fix the lower end of the coil 131, optionally, the electromagnetic weighting sensor 100 further includes a frame 173. A cylinder 171 is disposed on the frame 173. The ferrite 170 is sheathed on the cylinder 171 and fixed on the frame 173 to prevent the position of the ferrite 170 from changing and affecting the measurement effect. The strain gauge 172 can move up and down along the cylinder 171 as the coil 131 deforms. The cylinder 171 can be a common cylindrical structure with a small Young's modulus.

When there is a weight on the upper end of the strain gage 172, structural deformation is provided to change the length of the coil 131. The coil 131 is mainly responsible for coupling and resonating with the LC in the pre-stage circuit, and the inductance L1 of the coil 131 is affected by the length of the coil 131 and the ferrite 170. The heavier the weight, the more intersecting structures between the coil 131 and the ferrite 170, the larger the inductance L1, and vice versa. Finally, the voltage signal is output to represent the weight of the heavy object.

The ferrite 170 can be connected to the bottom of the frame 173 by glue. The cylinder 171 can be made of metal or a material with sufficient structural strength, integrally formed with the frame 173 or connected with high strength (welding or high-strength glue). Optionally, the frame 173 further includes side walls. Optionally, the frame 173 is a metal shell, which mainly plays the role of shielding and structural strength.

The embodiment of the present application further provides a mass detection system 10, as shown in FIG. 1, including at least one mass detection device 9 and a cloud server 6; wherein the mass detection device 9 communicates with the cloud server 6.

In some embodiments, the data in the mass detection device 9 can also be transmitted to the cloud storage through the communication module 4 using wifi or mobile data (2/3/4/5G) and can also be analyzed and calculated in the cloud or directly give instructions to the processor 3 from the cloud (the processor 3 can include an MCU or a microcomputer, etc.). The mass detection device 9 can also communicate through the communication module 4.

Figure 8:
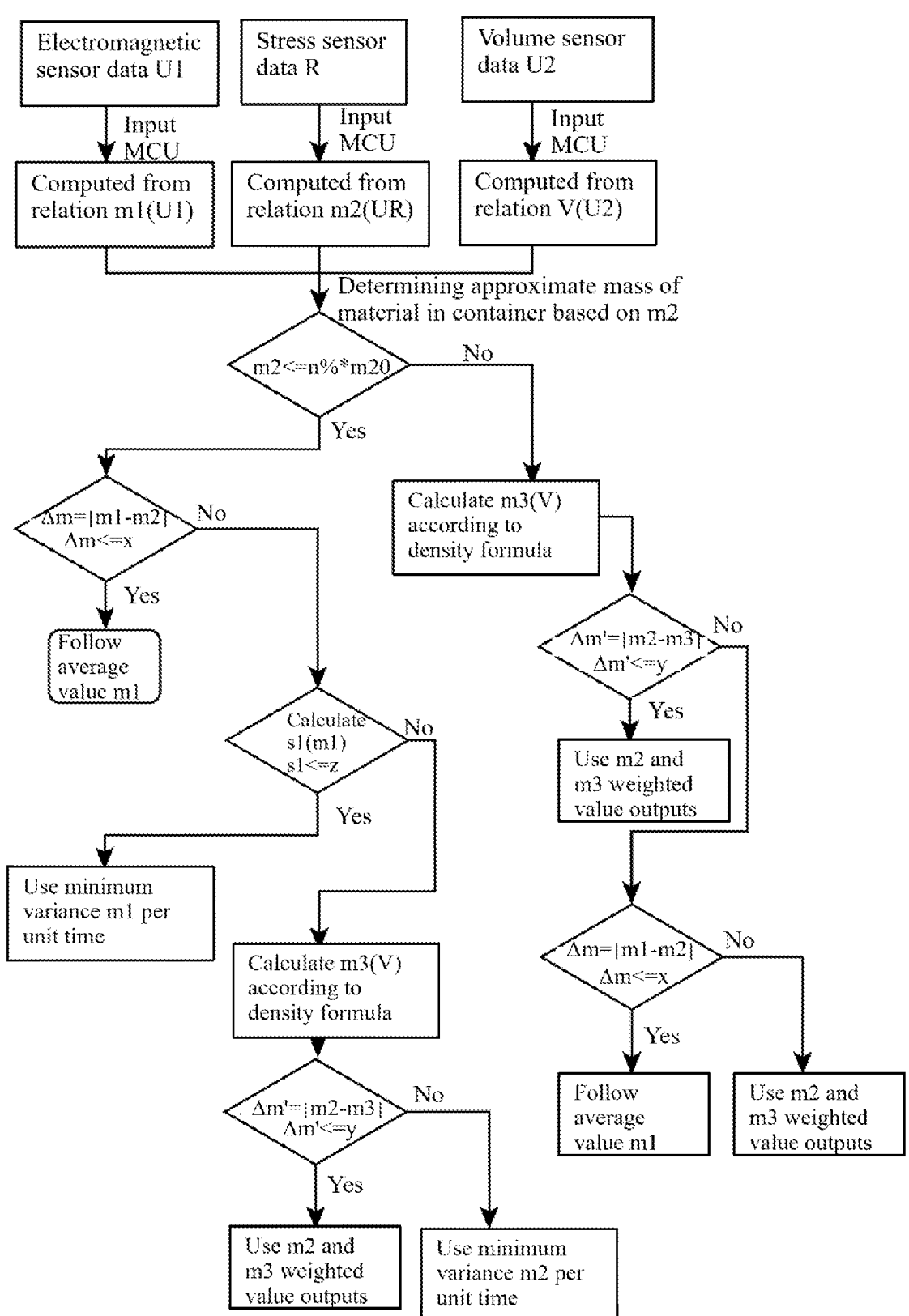
FIG. 8 is a flowchart of a mass detection method according to an embodiment of the present application.
Figure 9:
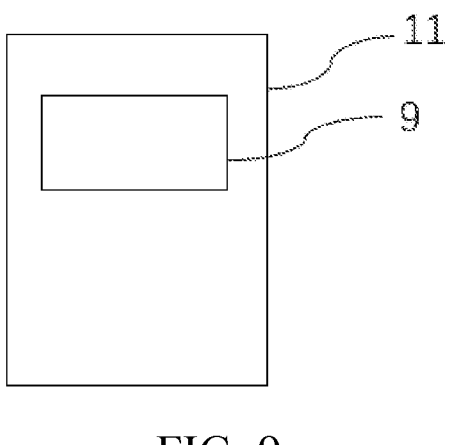
FIG. 9 is a schematic structural diagram of an electronic device according to an exemplary embodiment of the present application.

As shown in FIG. 8, which is a schematic flowchart of data processing by the processor 3 in the system. The following is a description of the design parameters in the figure:

U1—the input voltage parameter of the electromagnetic weighting sensor 100.

R—The input resistance parameter of the stress weighting sensor 200.

U2—volume sensor 300 input voltage parameter.

m1—the mass value of the object to be measured calculated according to the input voltage parameter U1 of the electromagnetic weighting sensor 100 (that is, the initially measured mass of the object to be measured by the electromagnetic weighting sensor 100).

m2—the mass value of the object to be measured calculated according to the input voltage parameter of the stress weighting sensor 200 (that is, the initially measured mass of the object to be measured by the stress weighting sensor 200).

m20—the preset mass value of the material to be measured.

m3—the mass value of the object to be measured calculated by the density formula according to the volume V (that is, the initially measured mass of the object to be measured by the volume sensor 300).

V—the volume value of the object to be measured calculated according to the input voltage parameter of the volume sensor 300.

n %—determination value of low margin percentage, generally set between 5% and 20%, determined according to the total treatment of different materials.

Δm—absolute value of m1−m2.

Δm'—the absolute value of m2−m3.

s1—the standard deviation calculated according to m1.

x—Δm difference preset threshold (second set threshold).

y—Δm' difference preset threshold (fourth set threshold).

z—default threshold of variance s1 (third set threshold).

After the processor 3 (MCU or microcomputer, etc.) obtains the input parameters U1, R, and U2, it calculates the mass or volume of the corresponding sensor through the formula given by the sensor to obtain m1, m2, and V.

During specific implementation, when obtaining data, it should be noted that the average value of a round of time is a relatively stable value.

Choose to compare the initially measured mass m2 of the object to be measured by the stress weighting sensor 200 with the first set threshold, and enter the first determination box at this time:

$$m2 \le n \% * m20$$

The main function is to determine whether the material balance is in a low state. n %*m20 is the first set threshold set in the specific embodiment. Note that n % is a preset value here. Usually, the storage structure with heavier material has a lower n % setting, whereas the storage structure with lighter material has a higher n % setting. In other embodiments, the first set threshold can be set as required.

If the determination result is "Yes", the system is indeed in a low margin state, then compare the absolute value of the difference between the initially measured mass m1 of the object to be measured by the electromagnetic weighting sensor 100 and the initially measured mass m2 of the object to be measured by the stress weighting sensor 200 with the second set threshold value x, and enter the second determination box:

$$\Delta m \le x$$

The main function is to determine the difference between the mass measurement of the system electromagnetic weighting sensor 100 and the stress weighting sensor 200. If the system handles the low material state and the Δm difference is not greater than the second set threshold x, it means that the system has no abnormal oscillation and noise. At this time, the average value of the initially measured mass m1 of the object to be measured by the electromagnetic weighting sensor 100 with high precision is output as the output result.

When the sensor assembly 1 includes a third sensor, optionally, the third sensor is the volume sensor 300. Conversely, if Δm is greater than the second set threshold x, compare the standard deviation of the mass of the object to be measured by the electromagnetic weighting sensor 100 with greater than the third set threshold z, and enter the third determination box:

$$s1 \leq z$$

The main function is to determine the size of the system vibration noise. When the system works in a low material state, vibrations such as machines and water pumps will cause huge errors in the sensor test precision. If the result of this determination box is indeed that s1 is smaller than z, it means that the system shock is not serious. At this time, the initially measured mass m1 of the object to be measured by the electromagnetic weighting sensor 100 with high precision is still output, but it is necessary to select m1 with the smallest variance per unit time as the output result to avoid oscillation errors. On the contrary, if it is greater than z, the mass m3 obtained by the volume sensor 300 is firstly calculated through the density formula at this time. Compare the absolute value of the difference between the initially measured mass m2 of the object to be measured by the stress weighting sensor 200 and the initially measured mass m3 of the object to be measured by the volume sensor 300 with the fourth set threshold y, and enter the fourth determination box:

$$\Delta m' \leq y$$

The main function is to determine whether the initially measured mass m3 of the object to be measured by the volume sensor 300 deviates from the initially measured mass m2 of the object to be measured by the stress weighting sensor 200 due to the huge difference in working temperature. The fourth set threshold y is a preset value according to different temperatures, and usually the larger the temperature difference, the higher the value of y needs to be set.

If the determination result Δm' is smaller than y, it means that the calculated value of m3 provided by the data of the volume sensor 300 is available. At this time, the weighted values of m2 and m3 are used as output. The specific weighting is preset according to the weight and density of different materials. Generally, the lower the weighting preset value of m3 is for materials with lower density, and vice versa. For example, if the fourth determination box is "No", it means that the system is working in an environment with large temperature difference and severe vibration, then directly output the mean value of the minimum variance per unit time of the initially measured mass m2 of the object to be measured by the stress weighting sensor 200 as a result.

If the first determination box is "No", the system is not in the low material scenario, then the system enters the fifth determination box, and the determination condition is the same as that of the fourth determination box to determine the temperature difference. Similarly, when the determination box is "Yes", the weighted value of the initially measured mass m2 of the object to be measured by the stress weighting sensor 200 and the initially measured mass m3 of the object to be measured by the volume sensor 300 is used as an output. If the fifth determination box is "No", enter the sixth determination box. This determination box has the same conditions as the second determination box. Determination is made on Δm and the second set threshold x, if the determination box is "Yes", then the average value of the initially measured mass m2 of the object to be measured by the stress weighting sensor 200 is used as the result. On the contrary, the initially measured mass m1 of the object to be measured by the electromagnetic weighting sensor 100 is used as an aid, and the weighted values of m1 and m2 are used as output results.

The following is the output in FIG. 7, that is, the corresponding material environment relationship:

Average value of m1—low material and stable vibration.

The average value of m1 minimum variance per unit time—low material and shock controllable.

Weighted average of m2 and m3—low material, serious vibration, and less influence of temperature difference.

The minimum variance per unit time in m2—low material, serious vibration, and great influence of temperature difference.

Weighted average of m2 and m3—high material, stable vibration, and less influence of temperature difference.

Average value of m2—high material, stable vibration, and great influence of temperature difference.

Weighted average value of m1 and m2—high material and controllable shock.

The mass detection device 9, mass detection system 10 and method provided in the present application can be applied to different material environments, can weaken the impact of vibration and temperature changes, and can improve mass detection precision.

In the specific implementation, different sensors can be used to process the values of 1-2 sensors that are most suitable for the working environment under various working conditions of the system and output the final stable and reliable quality results.

It can be understood that the processor 3 in the above mass detection device 9 may be configured to execute the steps included in any possible implementation of the above mass detection method.

For hardware implementation, the processor 3 can be implemented in one or more application specific integrated circuits (ASIC), digital signal processor (DSP), digital signal processing device (DSP Device, DSPD), programmable logic device (PLD), field-programmable gate array (FPGA), general-purpose processor, controller, microcontroller, microprocessor, other electronic units for performing the functions of this application or a combination thereof.

For a software implementation, the techniques herein may be implemented by units that perform the functions herein. The software codes may be stored in memory and executed by processor 3. The memory may be implemented in the processor 3 or external to the processor 3.

Those skilled in the art can appreciate that the units and algorithm steps of the examples described in conjunction with the embodiments disclosed herein can be implemented by electronic hardware, or a combination of computer software and electronic hardware. Whether these functions are executed by hardware or software depends on the specific application and design constraints of the technical solution. Skilled artisans may use different methods to implement the described functions for each specific application, but such implementation should not be regarded as exceeding the scope of the present application.

Those skilled in the art can clearly understand that for the convenience and brevity of the description, the specific working process of the above-described system, device and unit can refer to the corresponding process in the foregoing method embodiment, which will not be repeated here.

The mass detection device, system and method provided in the present application can be applied to different material environments, can weaken the impact of vibration and temperature changes, and can improve mass detection precision.

In addition, the embodiment of the present application also provides an electronic device 11, as shown in FIG. 8, the electronic device 11 may include the above-mentioned mass detection device 9.

The above-mentioned electronic device 11 can be, for example, but not limited to, any one of electronic scales, weight sensors, intelligent sweeping robots, coffee machines, non-food delivery robots, etc., or other portable devices or smart devices other than those listed above.

The electronic device 11 provided in this application is equipped with a mass detection device 9, which improves the detection precision.

It should be understood that the foregoing description is for purposes of illustration and not limitation. Many embodiments and many applications other than the examples provided will be apparent to those of skill in the art from reading the foregoing description. The scope of the present teachings, therefore, should be determined not with reference to the above description, but should be determined with reference to the preceding claims, along with the full scope of equivalents to which such claims are entitled. The disclosures of all articles and references, including patent applications and publications, are hereby incorporated by reference for completeness. The omission from the preceding claims of any aspect of the subject matter disclosed herein is not intended to be a disclaimer of such subject matter, nor should it be considered that the applicant did not consider the subject matter to be part of the disclosed subject matter of the present application.

What is claimed is:

1. A mass detection device, comprising:

a processor;

at least one sensor assembly, wherein the sensor assembly at least comprises a first sensor and a second sensor; the sensor assembly is configured to be connected to the processor and output a first sensing information and a second sensing information related to a mass of an object to be measured;

wherein the processor is configured to acquire the first sensing information and the second sensing information to determine an initially measured mass of the object to be measured by each sensor, and according to a comparison between a selected initially measured mass of the object to be measured and a first set threshold and a comparison between an absolute value of a difference in the initially measured mass of the object to be measured by each sensor and a second set threshold, to determine a final mass of the object to be measured;

wherein the first sensor comprises any one of an electromagnetic weighing sensor and a stress weighing sensor, and the second sensor comprises the other one of the electromagnetic weighing sensor and the stress weighing sensor.

2. The mass detection device according to claim 1, wherein the first sensor and the second sensor at least comprise one electromagnetic weighing sensor, and the electromagnetic weighing sensor comprises:

a frequency generation module configured to generate a set frequency signal;

a first resonance module configured to generate a primary resonance signal based on the set frequency signal;

a second resonance module configured to be connected to the first resonance module through a coupling capacitor to generate a secondary resonance signal based on the primary resonance signal; wherein the second resonance module comprises a coil arranged in a Z direction, a ferrite is arranged in the coil, and a height of the coil is higher than the ferrite; the coil is capable of carrying a weight to be measured, so as to deform to change an eigenfrequency of the electromagnetic weighting sensor;

an echo collection and processing module configured to be connected to the second resonance module to collect the secondary resonance signal and output a voltage signal varying according to the eigenfrequency of the electromagnetic weighting sensor.

3. The mass detection device according to claim 2, wherein the echo collection and processing module comprises a sampling unit, an operational amplification unit, and a voltage comparison unit;

wherein a current of the secondary resonance signal passes through the sampling unit, the operational amplification unit, and the voltage comparison unit in sequence, and outputs the voltage signal.

4. The mass detection device according to claim 2, wherein the frequency generation module comprises a crystal oscillator, and the electromagnetic weighting sensor further comprises a microprocessor, a driving assembly, and a switching transistor assembly;

wherein the switching transistor assembly comprises a first switching transistor Q1 and a second switching transistor Q2, sources of the first switching transistor Q1 and the second switching transistor Q2 are connected to a common terminal;

wherein a drain of the first switching transistor Q1 is connected to the first resonance module, and the drain of the first switching transistor Q1 is connected to a direct current power supply;

wherein a drain of the second switching transistor Q2 is connected to the second resonance module;

wherein a microprocessor is connected to the driving assembly, the driving assembly is respectively connected to the drain of the first switching transistor Q1 and the drain of the second switching transistor Q2, the driving assembly is further respectively connected to a gate control terminal of the first switching transistor Q1 and a gate control terminal of the second switching transistor Q2, so as to change the direct current power supply into a square wave with the same frequency as the crystal oscillator and input the square wave to the first resonance module and the second resonance module.

5. The mass detection device according to claim 3, wherein the electromagnetic weighting sensor further comprises a microprocessor connected to an output terminal of the voltage comparison unit to receive the voltage signal and output a mass data of the object to be measured.

6. The mass detection device according to claim 2, wherein the coil is a copper coil; a diameter of the coil ranges from 0.2 mm to 1 mm, and/or a number of turns of the coil ranges from 5 turns to 100 turns.

7. The mass detection device according to claim 2, wherein the ferrite is a cylinder, a thickness of the ferrite ranges from 33% to 66% of a height of the coil in a relaxed state, and/or a diameter of the ferrite ranges from 4.5 mm to 48 mm.

8. The mass detection device according to claim 1, wherein the sensor assembly further comprises:

a third sensor configured to acquire a third sensing information related to the mass of the object to be measured;

wherein the sensor assembly is further configured to output the third sensing information related to the mass of the object to be measured;

wherein the processor is further configured to acquire the third sensing information and determine the final mass of the object to be measured according to the first sensing information, the second sensing information, and the third sensing information.

9. The mass detection device according to claim 8, wherein the third sensor comprises a volume sensor.

10. A mass detection system, comprising:

at least one mass detection device;

a cloud server;

wherein the mass detection device communicates with the cloud server;

wherein the mass detection device comprises:

a processor;

at least one sensor assembly, wherein the sensor assembly at least comprises a first sensor and a second sensor; the sensor assembly is configured to be connected to the processor and output a first sensing information and a second sensing information related to a mass of an object to be measured;

wherein the processor is configured to acquire the first sensing information and the second sensing information to determine an initially measured mass of the object to be measured by each sensor, and according to a comparison between a selected initially measured mass of the object to be measured and a first set threshold and a comparison between an absolute value of a difference in the initially measured mass of the object to be measured by each sensor and a second set threshold, to determine a final mass of the object to be measured;

wherein the first sensor and the second sensor at least comprise one electromagnetic weighing sensor, and the electromagnetic weighing sensor comprises:

a frequency generation module configured to generate a set frequency signal;

a first resonance module configured to generate a primary resonance signal based on the set frequency signal;

a second resonance module configured to be connected to the first resonance module through a coupling capacitor to generate a secondary resonance signal based on the primary resonance signal; wherein the second resonance module comprises a coil arranged in a Z direction, a ferrite is arranged in the coil, and a height of the coil is higher than the ferrite; the coil is capable of carrying a weight to be measured, so as to deform to change an eigenfrequency of the electromagnetic weighting sensor;

an echo collection and processing module configured to be connected to the second resonance module to collect the secondary resonance signal and output a voltage signal varying according to the eigenfrequency of the electromagnetic weighting sensor.

11. The mass detection system according to claim 10, wherein the mass detection device further comprises a communication module, the communication module is connected with the processor to communicate with the cloud server or other mass detection devices through the communication module to complete data interaction.

12. The mass detection system according to claim 11, wherein when the mass detection system is working normally, the communication module performs data interaction with the cloud server within a fixed time period to update a usage of measured materials in real time.

13. The mass detection system according to claim 10, wherein the first sensor comprises any one of an electromagnetic weighing sensor and a stress weighing sensor, and the second sensor comprises the other one of the electromagnetic weighing sensor and the stress weighing sensor.

14. A mass detection method, wherein the method is applied to a mass detection device, wherein the mass detection device comprises:

a processor;

at least one sensor assembly, wherein the sensor assembly at least comprises a first sensor and a second sensor; the sensor assembly is configured to be connected to the processor and output a first sensing information and a second sensing information related to a mass of an object to be measured;

wherein the processor is configured to acquire the first sensing information and the second sensing information to determine an initially measured mass of the object to be measured by each sensor, and according to a comparison between a selected initially measured mass of the object to be measured and a first set threshold and a comparison between an absolute value of a difference in the initially measured mass of the object to be measured by each sensor and a second set threshold, to determine a final mass of the object to be measured;

wherein the method comprises:

acquiring the first sensing information and the second sensing information to determine an initially measured mass of the object to be measured by each sensor, and according to a comparison between a selected initially measured mass of the object to be measured and a first set threshold and a comparison between an absolute value of a difference in the initially measured mass of the object to be measured by each sensor and a second set threshold, to determine a final mass of the object to be measured;

wherein the first sensor comprises any one of an electromagnetic weighing sensor and a stress weighing sensor, and the second sensor comprises the other one of the electromagnetic weighing sensor and the stress weighing sensor.

15. The mass detection method according to claim 14, wherein the method further comprises:

when the selected initially measured mass of the object to be measured is less than or equal to the first set threshold, the final mass of the object to be measured is determined based on the initially measured mass of the object to be measured by each sensor and a first preset condition;

wherein the first preset condition comprises:

in a case where an absolute value of a difference between an initially measured mass of the object to be measured by the first sensor and an initially measured mass of the object to be measured by the second sensor is less than or equal to the second set threshold, an average value of the initially measured mass of the object to be measured by the first sensor is taken as the final mass of the object to be measured.

16. The mass detection method according to claim 15, wherein the first preset condition further comprises:

in a case where the absolute value of the difference between the initially measured mass of the object to be measured by the first sensor and the initially measured mass of the object to be measured by the second sensor is greater than the second set threshold and a variance of the initially measured mass of the object to be measured by the first sensor is less than or equal to a third set threshold, a minimum variance of the initially measured mass of the object to be measured by the first sensor within a unit time is taken as the final mass of the object to be measured.

17. The mass detection method according to claim 15, wherein when the sensor assembly comprises a third sensor, the first preset condition further comprises:

in a case where the absolute value of the difference between the initially measured mass of the object to be measured by the first sensor and the initially measured mass of the object to be measured by the second sensor is greater than the second set threshold and when a standard deviation of the initially measured mass of the object to be measured by the first sensor is greater than the third set threshold, the final mass of the object to be measured is determined according to a current state, comprising:

when an absolute value of a difference between the mass of the initially measured mass of the object to be measured by the second sensor and a mass of the initially measured mass of the object to be measured by the third sensor is less than or equal to the third set threshold, a weighted value of the mass of the initially measured mass of the object to be measured by the second sensor and the mass of the initially measured mass of the object to be measured by the third sensor is taken as the final mass of the object to be measured;

when the absolute value of the difference between the mass of the initially measured mass of the object to be measured by the second sensor and the mass of the initially measured mass of the object to be measured by the third sensor is greater than the third set threshold, a minimum variance of the initially measured mass of the object to be measured by the second sensor within the unit time is taken as the final mass of the object to be measured.

18. The mass detection method according to claim 14, wherein when the sensor assembly comprises a third sensor, the method further comprises:

when the selected initially measured mass of the object to be measured is greater than the first set threshold, the final mass of the object to be measured is determined based on the initially measured mass of the object to be measured by each sensor and a second preset condition;

wherein the second preset condition comprises:

in a case where an absolute value of a difference between an initially measured mass of the object to be measured by the second sensor and an initially measured mass of the object to be measured by the third sensor is less than or equal to a fourth set threshold, a weighted value of the mass of the initially measured mass of the object to be measured by the second sensor and the mass of the initially measured mass of the object to be measured by the third sensor is taken as the final mass of the object to be measured;

in a case where an absolute value of a difference between the initially measured mass of the object to be measured by the second sensor and the initially measured mass of the object to be measured by the third sensor is greater than the fourth set threshold, an average value of the initially measured mass of the object to be measured by the second sensor is taken as the final mass of the object to be measured;

in a case where the absolute value of the difference between the initially measured mass of the object to be measured by the second sensor and the initially measured mass of the object to be measured by the third sensor is greater than the fourth set threshold and the absolute value of the difference between the initially measured mass of the object to be measured by the first sensor and the initially measured mass of the object to be measured by the second sensor is greater than the second set threshold, a weighted value of the mass of the initially measured mass of the object to be measured by the first sensor and the mass of the initially measured mass of the object to be measured by the second sensor is taken as the final mass of the object to be measured.

* * * * *